United States Patent

Watanuki

[15] 3,698,803

[45] Oct. 17, 1972

[54] CAMERA FOR TAKING HEMISPHERICAL MOTION PICTURE

[72] Inventor: Toshio Watanuki, Tokyo, Japan

[73] Assignee: The Midori-Kai Co., Ltd., Minamiku, Osaka, Japan

[22] Filed: March 15, 1971

[21] Appl. No.: 124,378

[30] Foreign Application Priority Data

| | | |
|---|---|---|
| Sept. 9, 1970 | Japan | 45/79789 |
| Sept. 9, 1970 | Japan | 45/79790 |
| Sept. 9, 1970 | Japan | 45/79791 |
| Sept. 9, 1970 | Japan | 45/79792 |
| Sept. 9, 1970 | Japan | 45/79793 |

[52] U.S. Cl. .....................................352/69, 352/133

[51] Int. Cl. ..........................G03b 37/00, G03b 37/04

[58] Field of Search...........352/69, 70, 133, 243, 121

[56] References Cited

UNITED STATES PATENTS

| | | | |
|---|---|---|---|
| 3,234,865 | 2/1966 | Scott | 352/70 X |
| 3,271,097 | 9/1966 | De Montremy et al | 352/133 X |
| 1,550,944 | 8/1925 | Beidler et al. | 352/243 |
| 2,835,160 | 5/1958 | Waller | 352/70 |

OTHER PUBLICATIONS

Journal of the SMPTE, Vol. 74, Mar. 1965, pg. 237, " Part 6, How Elect. May Simplify This System in near Future"

*Primary Examiner*—Robert P. Greiner
*Attorney*—Dawson, Tilton, Fallon & Lungmus

[57] ABSTRACT

A camera for taking hemispherical motion pictures includes a plurality of cinecamera units provided with wide-angle lenses and arranged radially so that each cinecamera unit can cover within its picture angle each segment of an overall view around and above said camera. Disposed at the center of the arrangement of the cinecamera units is a center rotary shaft to be driven by a motor for synchronized rotation and carrying a main bevel gear. Each cinecamera unit has a torque delivery shaft extending toward the center rotary shaft and carrying a driven bevel bear meshing with the main bevel gear. Each cinecamera unit is further provided, on its side face, with a viewfinder for enabling the operator to view an erect image. A monitoring fish-eye lens is disposed above and centrally of the arrangement of the cinecamera units and at the image forming side of the fish-eye lens there is disposed a television camera tube which is connected to a monitoring television receiver.

5 Claims, 8 Drawing Figures

CAMERA FOR TAKING HEMISPHERICAL MOTION PICTURE

BACKGROUND AND SUMMARY

The present invention relates to a camera for taking hemispherical motion pictures.

Conventionally, various types of super-wide screen motion picture and circumferential screen motion picture have been provided on CinemaScope system or Cinerama system, but it has not been practiced to provide a hemispherical motion picture on a system in which all the subjects around and above a camera are photographed at the same time and the images thus obtained are projected on a spherical screen.

This invention contemplates provision of a camera for taking a novel motion picture of the type described which comprises a plurality of cinecamera units provided with wide-angle lenses and disposed about a vertical axis in radial directions so as to photograph the whole view all around and about the camera with the segments of the view covered by the cinecamera units respectively. With a camera of this type, all the cinecamera units have to be driven in synchronization in operative relation. Further since the cinecamera units in such arrangement must be positioned close to each other and close to the center of the overall arrangement to the greatest possible extent so as to minimize a dead zone, i.e., a section out of the coverage of the picture angle, there arises an inevitable need to provide an interlocking mechanism for the camera units which is compact and does not require a large space and which operates with high accuracy, it being further desired that the interlocking mechanism can be disposed in such position as free from interference with the field of view covered by each cinecamera unit. This invention provides a mechanism for driving cinecamera units in synchronized rotation which fulfils above requirements.

In making a single-frame exposure, unlike in usual continuous photographing operation, it is difficult to drive the respective camera units in operative relation by one motor through transmission means such as gear transmission system, because such structure becomes very complex due to the relationship between the cameras and the mechanism for transporting the film one frame. In accordance with the present invention, motors for making single-frame exposures are provided for the cinecamera units respectively, and the electrically synchronized operation of the motors ensures single-frame exposures for a hemispherical motion picture.

Further in photographing with a camera for taking hemispherical motion pictures, there is a need to monitor the whole image, namely the image of an overall view all around the above the camera. With a viewfinder device generally employed and consisting only of an optical system, it is difficult to obtain a clear overall image in an integrated form. Further it has to be avoided for an operator to perform monitoring at a position close to the camera during photographing operation, since he is likely to disturb the field of view of the cinecamera unit. The present invention contemplates use of a television system which makes it possible to monitor the whole image at a remote position. More specifically, an overall view all around and above the camera whose segments are photographed by the cinecamera units respectively are reproduced on the television receiver. Accordingly, during photographing operation, the scene to be photographed can be determined with accuracy and readily. Because monitoring can be performed from a remote position as desired, the monitor will not disturb the field of view covered by the camera.

In photographing with a camera for taking hemispherical motion picture, it is further necessary to ascertain the segmented view to be covered by each cinecamera unit. However, since the cinecamera units are disposed close to each other in radial arrangement, the operator can not see through a viewfinder of the conventional type which extends rearwardly of the camera. According to this invention, viewfinders are outwardly arranged in radial directions in the same manner as the cinecamera units, so that the operator can see on each cinecamera unit an erect image which is accurate, free of parallax and in the same condition as the images to be photographed.

With a hemispherical motion picture camera, in order to minimize a dead zone to be produced above the center of the camera, the cinecamera units have to be positioned close to the center of the overall arrangement to the greatest possible extent, with the circumference of circular arrangement of the objective lenses minimized. However, in the case of a system wherein the optical axis of the photographic lens is linear and the film plane is positioned in the rear of the lens as in usual cameras already known, the above-mentioned circumference becomes inevitably great, with the resultant disadvantage of a large dead zone.

In accordance with this invention, each of the radially arranged cinecamera units is provided with a photographic wide-angle lens comprising focusless optical system and image forming optical system which are disposed at a right angle with each other with a reflecting mirror interposed therebetween, a film plane being positioned below the image forming optical system. Accordingly, it has become possible to dispose the photographic lens closer toward the center by a distance corresponding to the length of the image forming optical system. More specifically, in the case where the focusless optical system and the image forming optical system are coaxially disposed in linear arrangement, the structure becomes greater in its entire length and, because of a necessity to position the shutter mechanism and the like in the rear of the optical systems, the lens has to be projected materially outwardly in a radial direction, with the result that the circumference of the circular arrangement of the lenses becomes great, whereas in accordance with this invention, the focusless optical system alone is projected in a radial direction. Further the position of the camera main body disposed below the optical systems does not result in increase in the above-mentioned circumference. For these reasons, the dead zone to be produced above the center of the camera as well as between the adjacent photographic lenses is minimized. Moreover, the lens, comprising the focusless optical system in front of the reflecting mirror and therefore permitting image formation only on the film plane, has a higher resolution and produces a brighter image than in the case wherein an image is formed at an intermediate position and the image is then sent forward in refracting manner for film exposure.

The present invention will be described in a greater detail with reference to the accompanying drawing.

DESCRIPTION OF SPECIFIC EMBODIMENT

Figure 1:
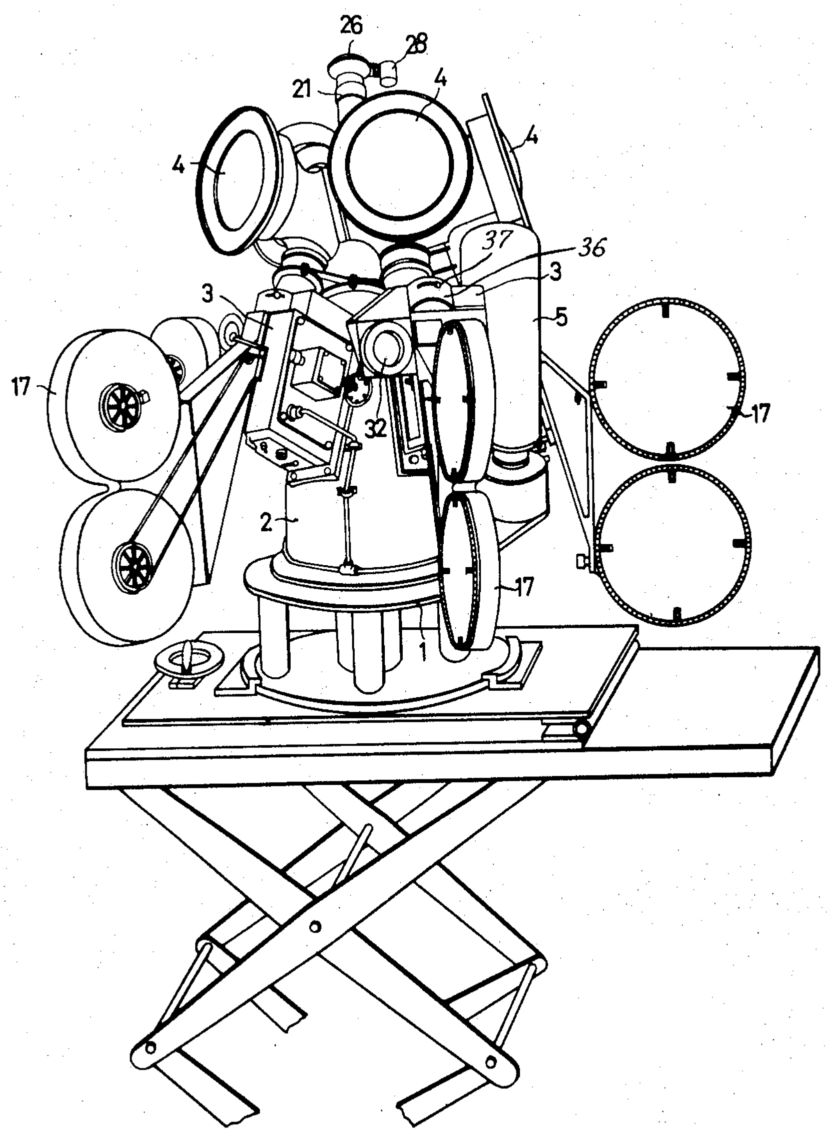
FIG. 1 is a perspective view of a camera for taking hemispherical motion pictures in accordance with this invention.
Figure 2:
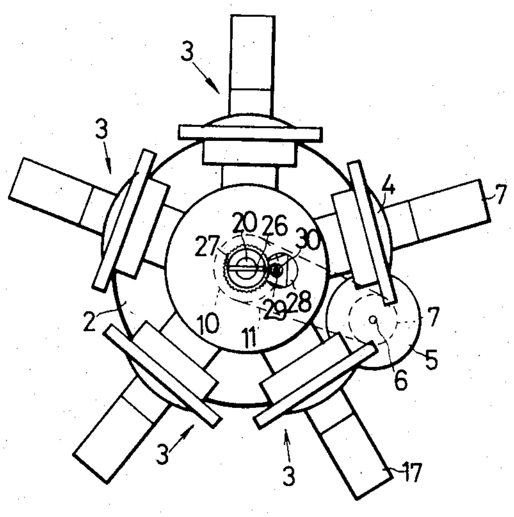
FIG. 2 is a plan view of the camera in FIG. 1.
Figure 3:
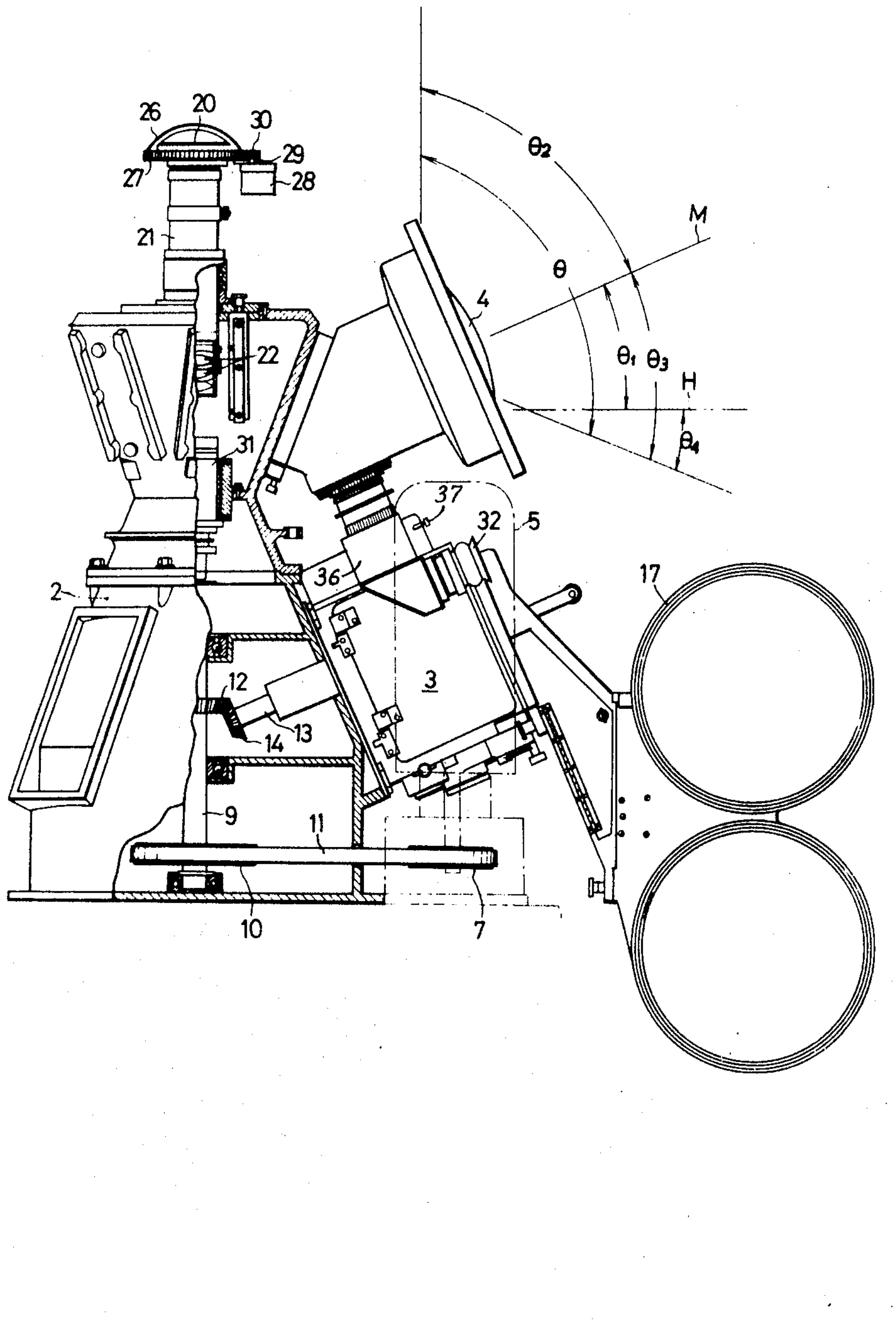
FIG. 3 is a front view partly broken away and showing the principal parts of one of five cinecamera units.

Referring to FIGS. 1 and 2, a base frame 1 is mounted on a wheeled support (not shown) and adapted for upward and downward movement, for rotation and inclination. A cylindrical holder 2 is fixedly disposed on the base frame 1. Five cinecamera units 3 are secured to the outer peripheral surface of the holder 2 in radial arrangement and provided with wide-angle lenses 4 respectively, each of the lenses 4 covering a picture angle $\theta$ of 110° and directed slightly upward so as to photograph each segment of the whole view all around and above the camera including a field of view of about 20° ($\theta_4$) beneath a horizontal line H. As shown in FIG. 3, the wide-angle lens 4 has an optical axis M which is slightly downwardly out of alignment so that the optical axis M and the horizontal line H define an angle $\theta_1$ of 23°30′. Thus, the wide-angle lens 4 covers a picture angle $\theta_2$ of 66°30′ above the horizontal line and a picture angle $\theta_3$ of 43°30′ beneath the line. In view of the fact that the eyes of the spectators are mainly directed to the image positioned approximately at the level of the eyes during projection, the optical axis M is positioned lower relative to the overall angle of view so as to obtain a photographic image in this portion with higher resolution than in the upper portion. A motor 5 for driving the five cinecamera units in synchronization is disposed between desired two adjacent cinecamera units 3 with its drive shaft 6 extending downward, the position being such that the motor does not interfere with the field of view of each cinecamera unit. An endless belt 11 is trained around a main drive pulley 7 mounted on a drive shaft 6 of the motor 5 and a driven pulley 10 mounted on the lower end of a rotary shaft 9 extending downward at the center of the holder 2 to transmit the torque of the motor 5 to the rotary shaft 9. A main bevel gear 12 is mounted on the rotary shaft 9 at its upper end. A torque delivery shaft 13 extends from the rear portion of each cinecamera unit 3 into the holder 2 and a driven bevel gear 14 is mounted on the extreme end of the shaft 13. The main bevel gear 12 meshes with the driven bevel gear 14. When rotated, the torque delivery shaft 13 drives shutter mechanism and film transport means in each cinecamera unit 3 respectively.

For photographing, a motor 5 for effecting synchronized rotation is driven at a predetermined speed by unillustrated electrical control means. By means of the main drive pulley 7, the endless belt 11, driven pulley 10, rotary shaft 9, main bevel gear 12 and respective driven bevel gears 14, the rotation is transmitted to the torque delivery shafts 13 on the cinecamera units 3 to drive all the shafts at the same speed in synchronization. Accordingly, the five cinecamera units 3 are driven in synchronized operative relation so as to photograph respective segments of the whole view around and above the camera at the same speed.

Although the drive shaft 6 of the motor 5 for synchronized rotation is associated with the rotary shaft 9 at the center of the holder 2 by the endless belt 11 in the embodiment above, the motor 5 may alternatively be disposed under the rotary shaft 9 and both may be connected directly by a coupling.

Figure 4:
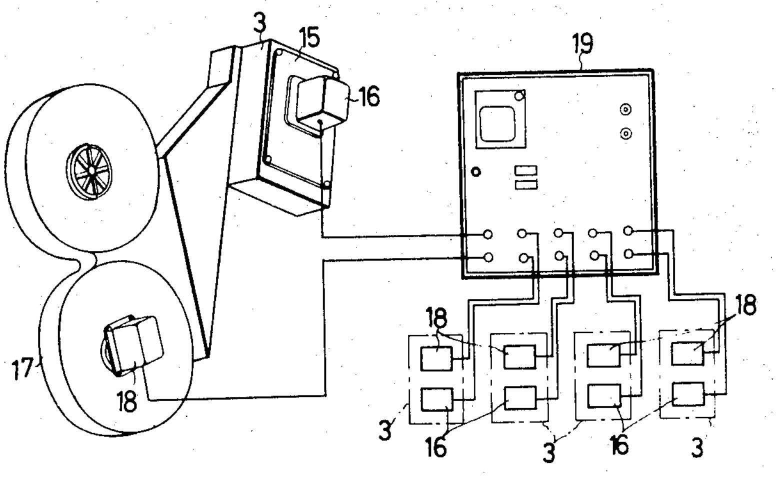
FIG. 4 is a diagram illustrating a system for making single-frame exposures.

With reference to FIG. 4, a frame transport motor 16, adapted to drive the drive shaft of a single-frame exposure mechanism on each cinecamera unit 3, is detachably mounted on a cover plate 15 on side face of each cinecamera unit 3. A film take-up motor 18 is detachably mounted on the side face of a film magazine 17 of each cinecamera unit 3 for driving a film take-up spool. For usual continuous photographing operation, both motors 16 and 18 are removed from the cinecamera unit 3 together with the cover plate 15 and magazine 17, and a cover plate and a magazine carrying no motors are alternatively fixed in place. The two motors 16 and 18 for single-frame exposure provided for each cinecamera unit 3 are electrically connected to control means 19 incorporating a timer and a pulse generator including an oscillator such as a quartz oscillator or tuning fork oscillator, the motors being adapted to be driven in synchronization at a constant speed and intermittently at a predetermined time interval by means of the timer to which the pulse is supplied from the pulse generator. When the motors 16 and 18 are rotated one revolution, the single-frame exposure mechanism on each cinecamera unit 3 effects a single-frame exposure. More specifically, every time the motors 16 and 18 are driven one revolution, the shutter blades are rotated one turn and, at the same time, the film is advanced one frame and a predetermined length of the film is wound up on the take-up spool in the magazine 17.

The shutter mechanism and film transport mechanism and the like in the cinecamera unit are already known in the art. By switching the interlocking relation between the transmission gear means for driving these mechanisms, the camera can be switched from continuous photographing operation to single-frame exposure and vice versa as desired. Accordingly, the single-frame exposure mechanism described above refers to a drive mechanism of shutter and claw as the camera has been made ready for single-frame exposure by switching. FIG. 4 specifically shows the cinecamera unit 3 brought to such state for making a single-frame exposure.

Figure 5:
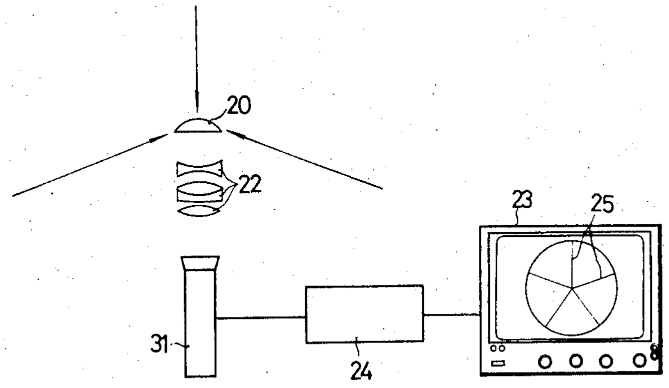
FIG. 5 is a diagram illustrating a monitoring system.
Figure 6:
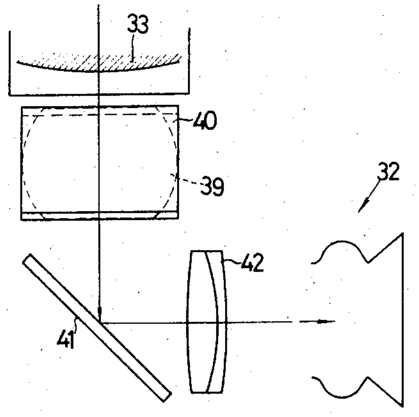
FIG. 6 is a side elevation in section showing the optical system in a device for ascertaining the angle of a segmented view.
Figure 7:
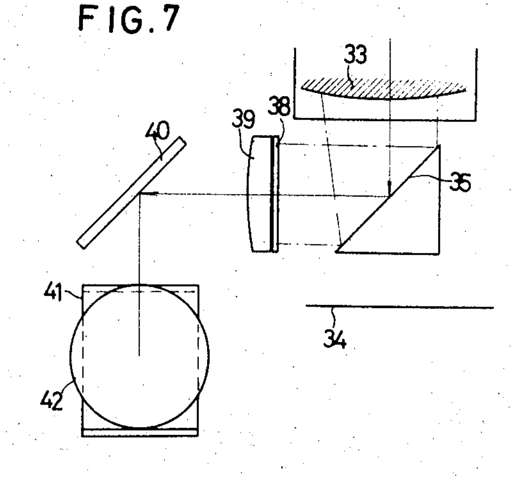
FIG. 7 is a front view in section of the optical system in FIG. 6.

Referring to FIGS. 1 to 3 and 5, a fish-eye lens 20, aligned with and disposed above the holder 2, covers an angle of view of 220° which is equal to the total of the picture angles respectively covered by the five cinecamera units 3, the fish-eye lens 20 thus being adapted to produce the same image as the overall image photographed by the five cinecamera units 3. A lens barrel 21 provided at its upper end with the fish-eye lens 20 mounted thereon includes relay lenses 22 therein. A television camera tube 31 comprising a vidicon is disposed at the image forming side of the optical system consisting of the lenses 20 and 22, namely, below the lens barrel 21 and is electrically connected to a monitoring television receiver 23 disposed at a remote position as seen in FIG. 5, the arrangement being such that the image produced by the fish-eye lens 20 can be reproduced on a cathode-ray tube in the receiver 23 through a television control unit 24. The circular screen of the receiver 23 is divided by five lines 25 radially extending from its center, the divided sections respectively corresponding to the segments of the whole view to be photographed by the five cinecamera units 3. In order to prevent halation produced by the sun, a striplike lens mask 26 is provided for the fish-eye lens 20. The lens mask 26 is secured at its opposite ends to an annular gear 27 rotatably fitted around the outer periphery of upper end of the lens barrel 21. A pinion 30 mounted on a drive shaft 29 of a small motor 28 is in meshing engagement with the annular gear 27 to drive the gear 27, by which the lens mask 26 is rotated in accordance with the position where the solar point is incident.

With reference to FIGS. 1, 3, 6 and 7, a viewfinder 32 for ascertaining angle of segmented view is fixed to one side of main body of each cinecamera unit 3. The viewfinders 32 radially extend outward so that the operator can see through them toward the center of the camera. The construction of the optical system of the viewfinder 32 is particularly shown in FIGS. 6 and 7 in detail. Referring to these figures, indicated at 33 is a group of lenses disposed at the extreme end of the wide-angle taking lens 4, at 34 an image forming plane where a film is positioned, and at 35 a reflecting mirror for the viewfinder disposed in front of the image forming plane 34, the reflecting mirror being adapted, during photographing operation, to be removed from the front of the plane 34 by moving a knob 37 on a mirror shift casing 36 as seen in FIGS. 1 and 3, the arrangement being such that safety means permits shooting when all of the reflecting mirrors 35 are brought to the photographing position. Indicated at 38 is a focusing screen disposed in the path of a beam reflected on the reflecting mirror 35, and at 39 a condenser lens positioned behind the focusing screen. Numerals 40 and 41 indicate relay reflecting mirrors for the image and a magnifying eyepiece is indicated at 42. By means of the optical system thus constructed, the viewfinder 32 enables the operator to see an erect image at a magnification of 2X in the same state as the subject to the photographed.

Figure 8:
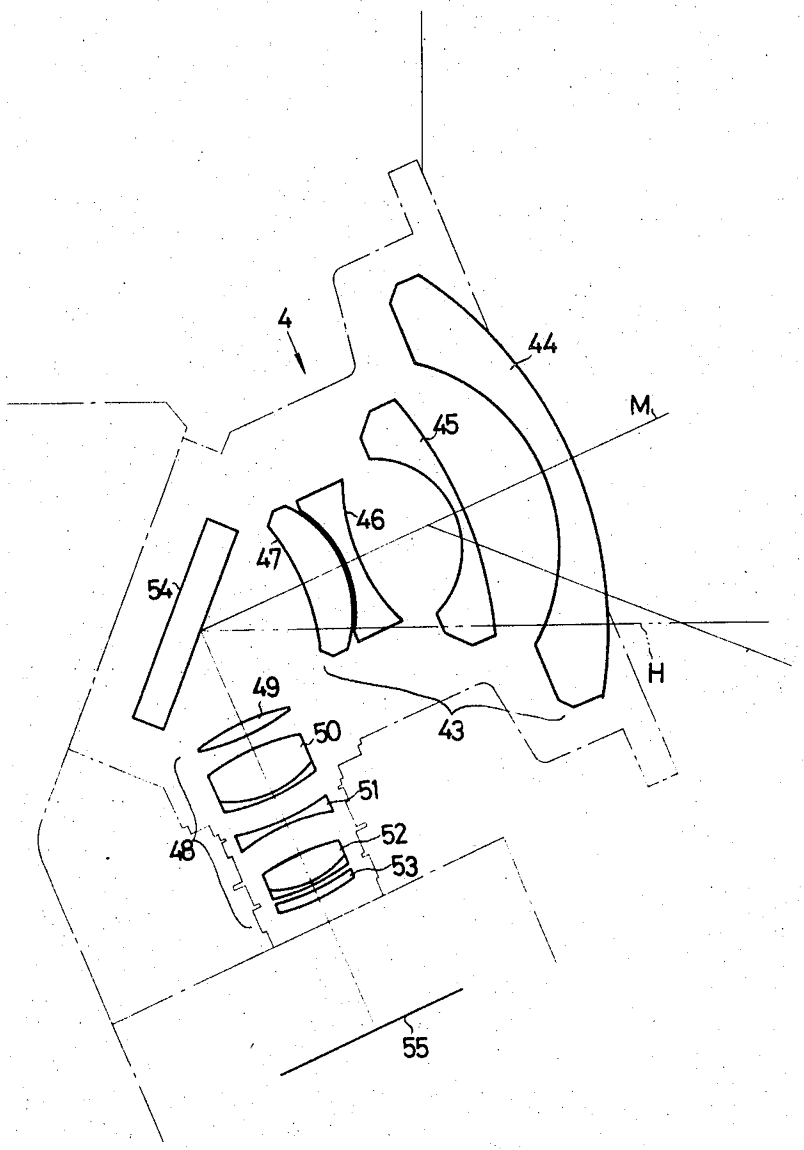
FIG. 8 is a diagram showing the structure of a taking lens.

The construction of the wide-angle taking lens 4 above is shown in FIG. 8. A focusless optical system or zoom lens 43 comprises a combination of four lenses 44, 45, 46 and 47, while an image forming optical system or relay lens 48 comprises a combination of seven lenses in five groups 49, 50, 51, 52 and 53. Both optical systems 43 and 48 are coaxially disposed at a right angle with each other, with a reflecting mirror 54 interposed therebetween. Positioned below the image forming optical system 48 is a film plane 55. The wide-angle lens 4 has a focal length of 19.25 mm and a maximum relative aperture of F/3.5.

I claim:

1. A camera for taking a hemispherical motion picture comprising a center rotary shaft adapted to be driven by a motor for synchronized rotation and carrying a main bevel gear secured thereto, a plurality of cinecamera units arranged radially around said rotary shaft and each provided with a wide-angle taking lens, each of said cinecamera units being adapted to cover within its picture angle each segment of an overall view around and above said camera, a torque delivery shaft extending from each of said cinecamera units toward said center rotary shaft and fixedly carrying thereon a driven bevel gear in meshing engagement with said main bevel gear whereby rotation of the rotary shaft causes rotation of each of the torque delivery shafts and each cinecamera unit is operated simultaneously, a frame transport motor detachably mounted on each of said cinecamera units for driving a drive shaft of a single-frame exposure mechanism, and a film take-up motor detachably mounted on each of said cinecamera units for driving a take-up spool of a film magazine, the motors on each cinecamera unit being adapted for intermittent and synchronized operation by means of a timer in response to pulses from a pulse generator.

2. A camera for taking a hemispherical motion picture comprising a center rotary shaft adapted to be driven by a motor for synchronized rotation and carrying a main bevel gear secured thereto, a plurality of cinecamera units arranged radially around said rotary shaft and each provided with a wide-angle taking lens, each of said cinecamera units being adapted to cover within its picture angle each segment of an overall view around and above said camera, a torque delivery shaft extending from each of said cinecamera units toward said center rotary shaft and fixedly carrying thereon a driven bevel gear in meshing engagement with said main bevel gear whereby rotation of the rotary shaft causes rotation of each of the torque delivery shafts and each cinecamera unit is operated simultaneously, a viewfinder mounted on the side face of each of said cinecamera units, each viewfinder extending outwardly from the associated cinecamera unit and including a plurality of lenses positioned in the path of light rays passing through the wide angle lens of the associated cinecamera unit whereby the operator can view an erect image in the same state as the subject to be photographed and a reflecting mirror in the path of said light rays movably mounted in front of an image forming plane for the wide angle lens whereby the mirror can be moved during photographing to permit said light rays to pass to the image forming plane.

3. The camera of claim 2 in which the optical axis of each of said wide-angle taking lenses is positioned obliquely upwardly of the horizontal.

4. A camera for taking a hemispherical motion picture comprising a center rotary shaft adapted to be driven by a motor for snychronized rotation and carrying a main bevel gear secured thereto, a plurality of cinecamera units arranged radially around said rotary shaft and each provided with a wide-angle taking lens, each of said cinecamera units being adapted to cover within its picture angle each segment of an overall view around and above said camera, a torque delivery shaft extending from each of said cinecamera units toward said center rotary shaft and fixedly carrying thereon a driven bevel gear in meshing engagement with said main bevel gear whereby rotation of the rotary shaft causes rotation of each of the torque delivery shafts and each cinecamera unit is operated simultaneously, each wide-angle taking lens including a focusless optical system and an image forming optical system which are disposed at a right angle with each other, and a reflecting mirror interposed therebetween, the film plane for each wide-angle taking lens being positioned below the image forming optical system for the lens.

5. The camera of claim 4 in which the optical axis of each of said wide-angle taking lenses is positioned obliquely upwardly of the horizontal.

* * * * *